(12) United States Patent
Nakajima

(10) Patent No.: US 11,400,812 B2
(45) Date of Patent: Aug. 2, 2022

(54) DISPLAY UNIT

(71) Applicant: Yazaki Corporation, Tokyo (JP)

(72) Inventor: Harutoshi Nakajima, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 229 days.

(21) Appl. No.: 16/851,669

(22) Filed: Apr. 17, 2020

(65) Prior Publication Data

US 2020/0369151 A1 Nov. 26, 2020

(30) Foreign Application Priority Data

May 21, 2019 (JP) .............................. JP2019-095315

(51) Int. Cl.
| | |
|---|---|
| *G01C 21/00* | (2006.01) |
| *B60K 35/00* | (2006.01) |
| *B60R 1/00* | (2022.01) |
| *G01C 21/36* | (2006.01) |
| *G01C 23/00* | (2006.01) |

(52) U.S. Cl.
CPC .............. *B60K 35/00* (2013.01); *B60R 1/001* (2013.01); *G01C 21/365* (2013.01); *G01C 21/3697* (2013.01); *G01C 23/00* (2013.01); *B60K 2370/154* (2019.05); *B60K 2370/155* (2019.05); *B60K 2370/1529* (2019.05); *B60K 2370/166* (2019.05); *B60K 2370/1868* (2019.05); *B60R 2300/205* (2013.01); *B60R 2300/207* (2013.01); *B60R 2300/302* (2013.01); *B60R 2300/8086* (2013.01)

(58) Field of Classification Search
None
See application file for complete search history.

(56) References Cited

U.S. PATENT DOCUMENTS

| | | | |
|---|---|---|---|
| 2017/0161009 A1* | 6/2017 | Ogisu | G06F 3/1446 |
| 2017/0276938 A1* | 9/2017 | Nakashima | G08G 1/166 |
| 2018/0157037 A1* | 6/2018 | Kasazumi | G06V 20/20 |
| 2019/0329716 A1* | 10/2019 | Kubota | G02B 27/0101 |
| 2021/0123760 A1* | 4/2021 | Katagiri | G01C 21/365 |
| 2021/0356289 A1* | 11/2021 | Horihata | G01C 21/365 |
| 2021/0372810 A1* | 12/2021 | Hato | G08G 1/096855 |

FOREIGN PATENT DOCUMENTS

| | | |
|---|---|---|
| EP | 3 031 655 A1 | 6/2016 |
| JP | 2015-016705 A | 1/2015 |
| JP | 2015-017810 A | 1/2015 |
| JP | 2015-219782 A | 12/2015 |
| JP | 2016-182845 A | 10/2016 |
| JP | 2018-205254 A | 12/2018 |
| JP | 2019-12483 A | 1/2019 |
| WO | 2016/052186 A1 | 4/2016 |

* cited by examiner

*Primary Examiner* — James M McPherson
(74) *Attorney, Agent, or Firm* — Sughrue Mion, PLLC

(57) ABSTRACT

A display unit of the present invention includes a first display (head-up display) for displaying various information by irradiating a surface to be irradiated with video light and a control part for controlling the first display. The control part controls to display information on an inter-vehicle distance (bar graph), information on an inter-intersection (digital numerical value), an intersection image, and an arrow.

7 Claims, 11 Drawing Sheets

DISPLAY UNIT

CROSS-REFERENCE TO RELATED APPLICATIONS

This application is based on and claims priority under 35 USC 119 from Japanese Patent Application No. 2019-095315 filed on May 21, 2019, the contents of which are incorporated herein by reference.

TECHNICAL FIELD

The present invention relates to a display unit mounted on a vehicle.

BACKGROUND ART

As a display unit for assisting driving by a driver, there are inventions disclosed in Patent Literatures 1 to 3.

CITATION LIST

Patent Literature

Patent Literature 1: JP-A-2015-016705
Patent Literature 2: JP-A-2015-017810
Patent Literature 3: JP-A-2016-182845

SUMMARY OF INVENTION

Patent Literature 3 discloses a head-up display device that enables a driver to intuitively acquire necessary information. In particular. FIGS. 3A to 3D of Patent Literature 3 describe a schematic image represented by video light emitted from the head-up display device toward a windshield. As shown in FIG. 3C of Patent Literature 3, the driver can know that the vehicle should "turn right" at "500 m ahead" by viewing an arrow image ARI and a distance image DTI.

In FIGS. 5 and 6 of Patent Literature 3 describe an example of an image represented by the video light emitted from the head-up display device toward the windshield WSD. In FIGS. 5 and 6 of Patent Literature 3, a positional relationship between a boundary image BDI and an area above the boundary image BDI is similar to a positional relationship between a hood and a scenery seen through the windshield. In addition, a distance between a symbol image SBI and the boundary image BDI is represented as a distance between the target preceding vehicle (corresponding to the symbol image SBI) and the vehicle (corresponding to the boundary image BDI).

However, it is not sufficient for the driver to be presented with a direction of turning right or left at an intersection at which a host vehicle is about to enter, and a distance to the intersection. As presented by a car navigation system, there is a desire for the driver to know how the road intersects at the intersection at which the host vehicle is about to enter. On the other hand, with the video light by the head-up display, it is difficult to present as much information as a display of the car navigation system due to a hardware structure. The present inventor has developed a display method capable of presenting a shape of an intersection to a driver within a limited amount of information that can be presented by video light by a head-up display.

In Patent Literature 3, various information is presented to the driver in each mode by switching a display mode by the head-up display by the driver. However, there are many drivers who feel such switching of the display mode as a burden. The present inventor has also developed a display method in which sufficient information necessary for driving assistance of a driver can be presented by a head-up display without switching the display mode unlike in Patent Literature 3, in addition to the above-described display method of the shape of the intersection.

The present invention has been made in view of the above circumstances, and an object of the present invention is to provide a display unit that can present a shape of an intersection to a driver and present sufficient information necessary for driving assistance of the driver by a head-up display.

In order to achieve the above object, the display unit according to the present invention is characterized by the following (1) to (10).

(1) A display unit including:
a first display configured to display various information by irradiating a surface to be irradiated with video light; and
a control part configured to control the first display,
wherein the control part controls to display information on an inter-vehicle distance between a host vehicle and another vehicle traveling in front of the host vehicle in a traveling direction, information on an inter-intersection distance between the host vehicle and a nearest intersection existing in front of the host vehicle in the traveling direction, an intersection image representing end portions in a width direction of roads intersecting at the intersection, and an arrow pointing to the road on which the host vehicle should travel at the intersection on the first display.

(2) The display unit according to the above (1),
wherein the intersection image includes a first road and a second road intersecting at the intersection,
wherein the arrow includes a first arrow portion extending along the first road on which the host vehicle is traveling toward the intersection, and a second arrow portion extending along the second road on which the host vehicle traveling away from the intersection advances after entering the intersection, and
wherein the control part causes the first display to display the first arrow portion whose outer shape is along both end portions in the width direction of the first road so as to fit the first arrow portion in the first road in the intersection image.

(3) The display unit according to the above (2),
wherein the control part causes the first display to display the information on the inter-vehicle distance so as to fit the information in the first road.

(4) The display unit according to the above (3),
wherein the information on the inter-vehicle distance is represented as a bar graph in which a length of the bar varies according to the inter-vehicle distance, and wherein the control part causes the first display to display the bar graph such that a direction in which the length of the bar varies is along an extending direction of the first road.

(5) The display unit according to the above (4),
wherein the intersection image is represented as a pattern having a depth along the extending direction of the first road, and
wherein the control part causes the first display to display the first arrow portion and the bar graph such that the intersection image is tapered toward a vanishing point thereof.

(6) The display unit according to the above (5),
wherein the first arrow portion is divided into a left side line portion along a left end portion of the first road in the width direction and a right side line portion along a right end portion of the first road in the width direction, and one end portion of the left side line portion and one end portion of the right side line portion in a depth direction are connected to the second arrow portion, and wherein the control part causes the first display to display the bar graph such that the bar graph fits within an area of the first road surrounded by the left side line portion and the right side line portion forming the first arrow portion and the second arrow portion.

(7) The display unit according to the above (6), further including:

a second display configured to display various information.

wherein the control part controls the second display, and causes the second display to display a road image simulating a detailed shape related to the first road, and display the host vehicle traveling on the first road by superimposing host vehicle on the road image.

(8) The display unit according to the above (7), wherein the control part performs a highlighted display of a lane to be traveled in the road image in order to turn right or left, when the host vehicle turns right or left at the intersection.

(9) The display unit according to the above (7) or (8), wherein the control part superimposes the information on the inter-vehicle distance on the road image and displays the information in front of the host vehicle in the traveling direction.

(10) The display unit according to any one of the above (7) to (9), wherein the control part performs a highlighted display of a lane to be changed by the host vehicle in the road image when another vehicle is traveling behind the host vehicle in the traveling direction in the lane to be changed by the host vehicle even when a lane is changed.

According to the display unit having the above configuration (1), the intersection image is very simple information including only information on edges of a plurality of roads (the first road 81 and the second road 82 in FIGS. 4 and 5A) forming the intersection. Such an intersection image is suitable as information to be irradiated by the head-up display. Therefore, the driver can accurately grasp the shape of the road by visually recognizing the intersection image irradiated by the head-up display. Further, the information on the inter-vehicle distance, the information on the inter-intersection distance, and the arrow pointing to the road on which the host vehicle should travel are displayed in combination in the intersection image. As a result, the driver can grasp how many steering angles are required to operate a steering wheel for turning right or left while imagining the shape of the intersection at which the host vehicle turns right or left. Such driving assistance is very beneficial for the driver.

According to the display unit having the above configuration (2), it is possible to cause the driver to recognize that the first arrow portion is the host vehicle traveling on the first road by clearly indicating that the first arrow portion extends in the extending direction of the first road.

According to the display unit having the above configuration (3), it is not necessary to secure the area for presenting the information on the inter-vehicle distance separately from the first road by displaying the information on the inter-vehicle distance on the first road. Therefore, the limited irradiation range irradiated by the head-up display can be effectively used.

According to the display unit having the above configuration (4), the driver can intuitively grasp the inter-vehicle distance between the host vehicle and the other vehicle positioned in front of the host vehicle by the bar graph.

According to the display unit having the above configuration (5), since the intersection image is displayed with the depth, the height of the irradiated intersection image can be reduced as compared with a case where the intersection is irradiated as a plan view as viewed from above. That is, a range in which the intersection image is irradiated can be suppressed. Therefore, the limited irradiation range irradiated by the head-up display can be effectively used.

According to the display unit having the above configuration (6), by drawing the bar graph in a space left inside the arrow, it is not necessary to secure an area for presenting the information on the inter-vehicle distance separately from the areas of the first road and the arrow. Therefore, the limited irradiation range irradiated by the head-up display can be effectively used.

According to the display unit having the above configuration (7), it is possible to provide the driving assistance by combining the head-up display with a display means different from the head-up display. That is, the driving assistance by another display means can compensate for a structural disadvantage of the head-up display while utilizing advantages of the driving assistance by the head-up display.

According to the display unit having the above configuration (8), the driver can grasp which lane should be traveled in order for the host vehicle to turn left by visually recognizing the highlighted display.

According to the display unit having the above configuration (9), the driver can grasp the distance to the other vehicle traveling ahead.

According to the display unit having the above configuration (10), the driver can change the lane while paying attention to other vehicles by visually recognizing the highlighted display when the other vehicle is traveling behind the host vehicle in the lane to be changed even when the lane is changed.

According to the display unit of the present invention, it is possible to present the shape of the intersection to the driver and present sufficient information necessary for the driving assistance of the driver by the head-up display.

The present invention has been briefly described above. Further, details of the present invention will be clarified by reading a mode (hereinafter, referred to as "embodiment".) for carrying out the invention to be described below with reference to the accompanying drawings.

BRIEF DESCRIPTION OF DRAWINGS

FIG. 5A is a pattern when video light from the head-up display 35 is visually recognized, and FIG. 5B is a plan view in the vicinity of the intersection as viewed from above, which schematically explains display contents of FIG. 5A.

DESCRIPTION OF EMBODIMENTS

A specific embodiment according to the present invention will be described below with reference to the drawings. A display unit according to an embodiment of the present invention is incorporated on a surface of an instrument panel as a part of the instrument panel.
[Configuration of Display Unit]

Figure 1:
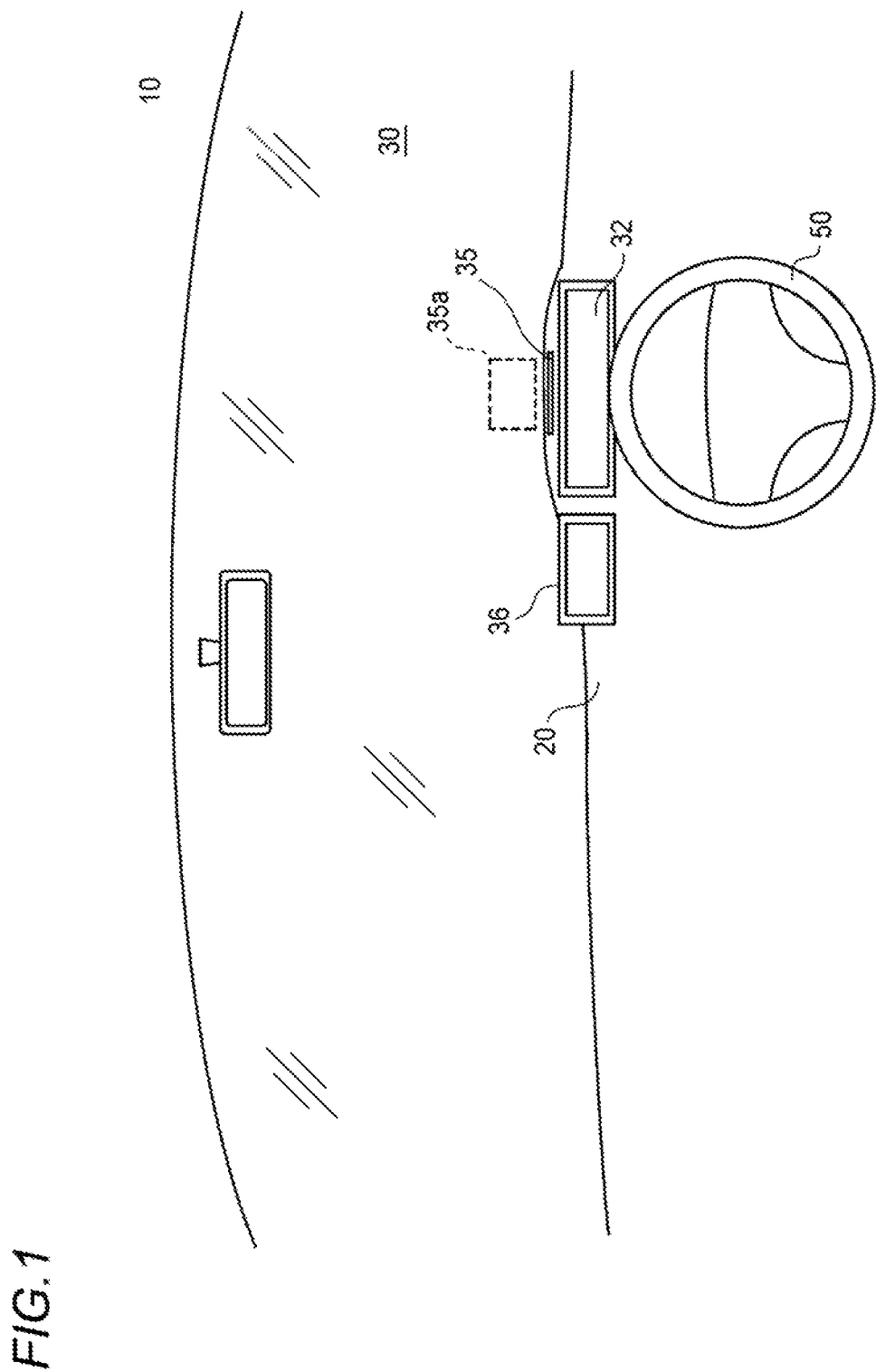
FIG. 1 is a from view showing an external appearance in the vicinity of an instrument panel 20 in which a display unit 30 according to an embodiment of the present invention is incorporated.

FIG. 1 is a front view showing an external appearance in the vicinity of an instrument panel 20 in which a display unit 30 according to the embodiment of the present invention is incorporated. A windshield 10, the instrument panel 20, the display unit 30, a steering wheel 50, or the like are disposed in a vehicle interior as viewed from a driver's seat side. In addition, the display unit 30 includes a plurality of displays including a meter panel 32 (may be referred to as a second display), a head-up display 35 (may be referred to as a first display), and a liquid crystal display 36.

The meter panel 32 of the display unit 30 is configured by a liquid crystal display. The meter panel 32 may also be referred to as a digital meter, a graphic meter, a display meter, or the like. Various instruments such as a speedometer, a tachometer, a power meter, a thermometer, and a fuel gauge are displayed on the meter panel 32 as images. The meter panel 32 is incorporated in and integrated with the instrument panel 20 at a center front surface of the instrument panel 20, which is positioned closest to the steering wheel 50 and is easily viewable by a driver.

The liquid crystal display 36 different from the meter panel 32 is disposed on a left side of the meter panel 32. The liquid crystal display 36 displays various information such as driving information, danger notification information, navigation information, and entertainment information.

The head-up display 35 that projects toward the windshield 10 is disposed on an upper surface of the instrument panel 20 close to the windshield 10. The head-up display 35 projects various information onto an area 35a on the windshield 10 that is easily visible by the driver.

The display unit 30 presents various information to the driver from the meter panel 32, the head-up display 35, and the liquid crystal display 36, thereby performing driving assistance for the driver.

Figure 2:
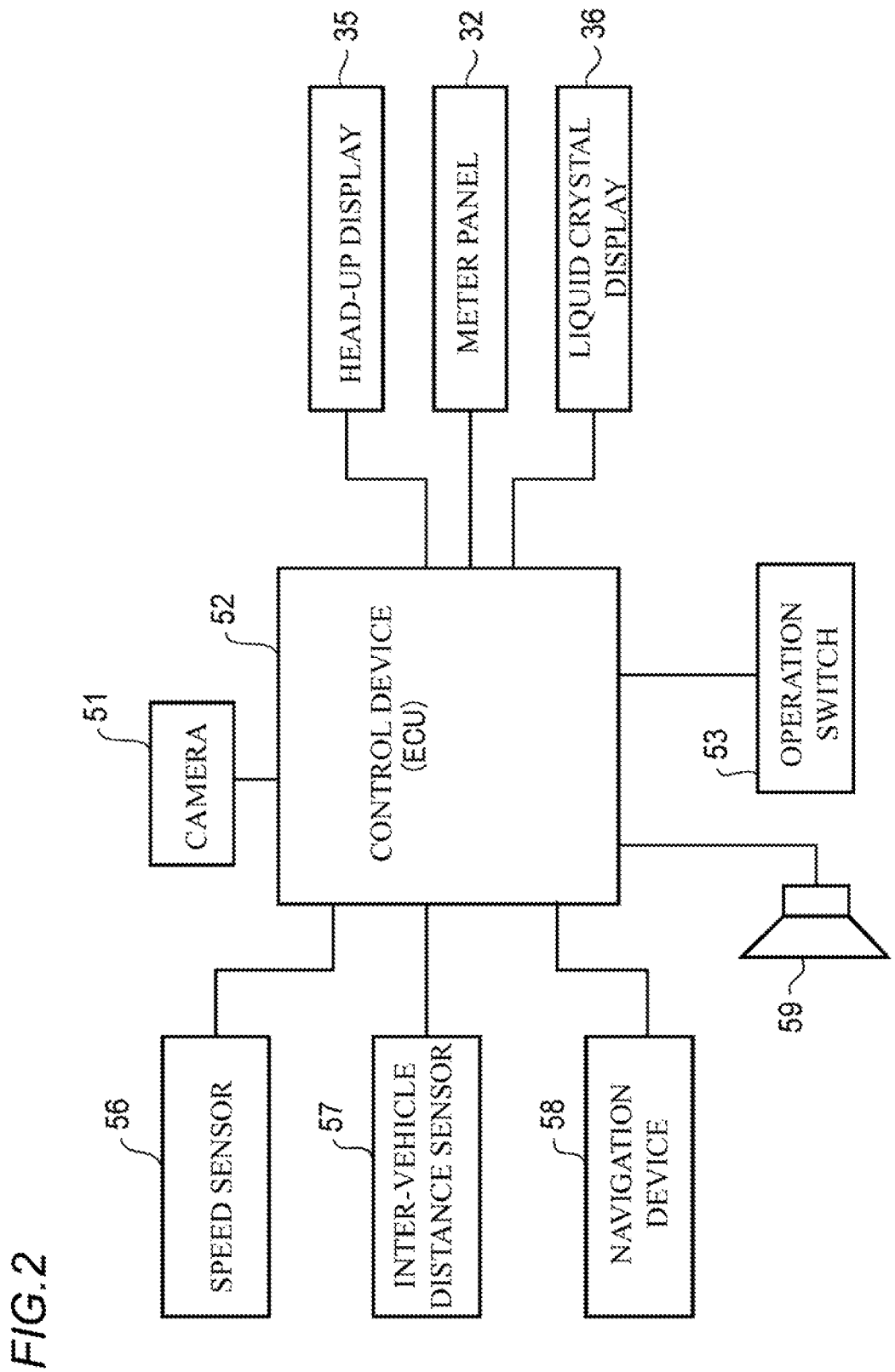
FIG. 2 is a diagram showing a hardware configuration around a control device 52 that controls the instrument panel 20 and the display unit 30 disposed around the instrument panel 20.

FIG. 2 is a diagram showing a hardware configuration around a control device 52 that controls the instrument panel 20 and the display unit 30 disposed around the instrument panel 20. The control device 52 is configured by an electronic control unit (ECU). The meter panel 32, the head-up display 35, and the liquid crystal display 36 described above are connected to the control device 52. In addition, a speed sensor 56, an inter-vehicle distance sensor 57, a navigation device 58, a speaker 59, an operation switch (SW) 53, a camera 51, or the like are connected to the control device 52.

The speed sensor 56 detects a speed of a vehicle. The inter-vehicle distance sensor 57 transmits and receives infrared rays to measure a distance to an object, and detects an approach to a host vehicle. Incidentally, the approach to the host vehicle may be detected by analyzing an image captured by the camera. In addition, a plurality of inter-vehicle distance sensors 57 may be provided so as to be able to detect the approach of the object to the host vehicle not only in a front-rear direction of the vehicle but also in a left-right direction of the vehicle.

The navigation device 58 is equipped with a global positioning system (GPS) and map data, and has a function of guiding the host vehicle to a destination. Here, a navigation screen is displayed on the liquid crystal display 36. The speaker 59 emits sound information such as driving information, an alarm, and music in accordance with audio data output from the control device 52.

The operation SW 53 used by the driver for various switch inputs (including, for example, a push-down operation of a winker lever or the like), selection of entertainment information, or the like. The camera 51 is attached to a front portion, a rear portion, a left side portion, a right side portion, or the like of the vehicle, and captures an image of the front, rear, left, right, or the like of the vehicle to acquire the image. The image captured by the camera 51 is use for detecting an obstacle, detecting the approach to the host vehicle, or the like.
[Display Contents by Display Unit]

Figure 3:
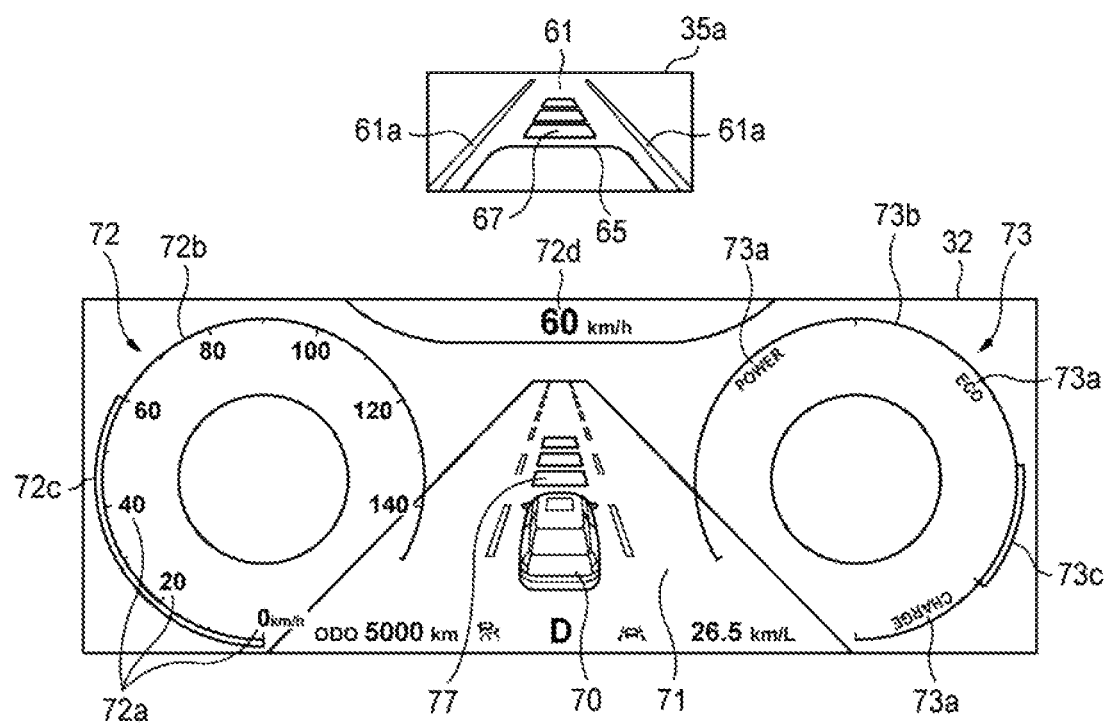
FIG. 3 is a diagram for explaining display contents of the display unit 30 according to the embodiment of the present invention when a host vehicle travels straight ahead.
Figure 4:
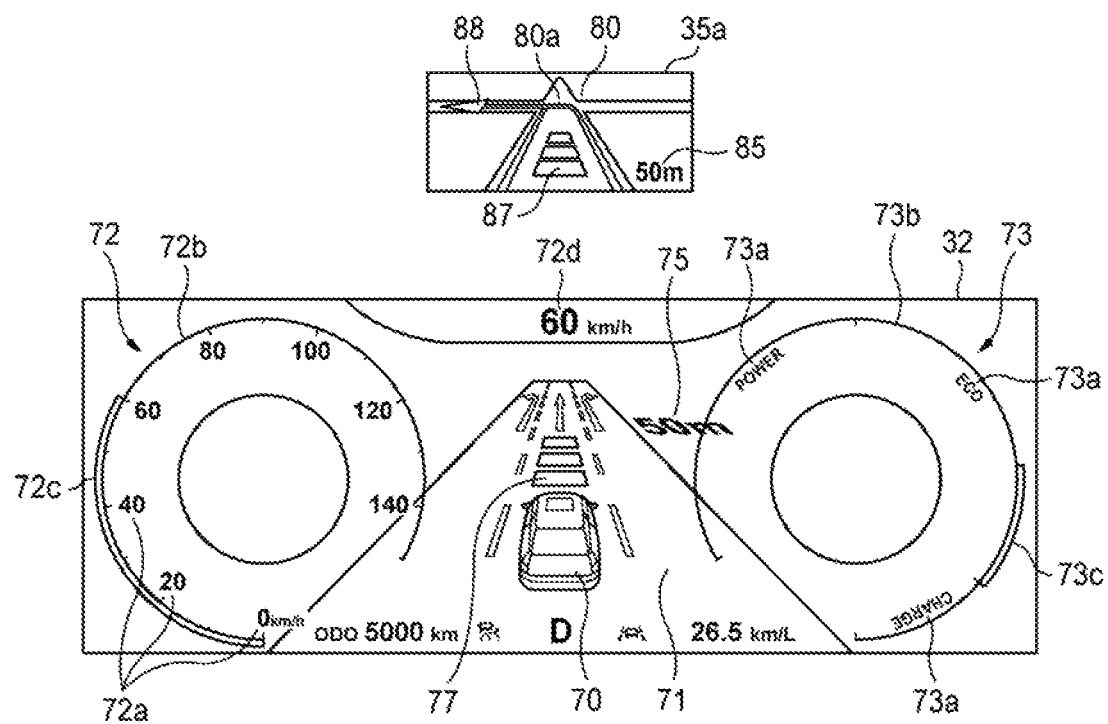
FIG. 4 is a diagram for explaining display contents of live display unit 30 according to the embodiment of the present invention when the host vehicle turns left at the next intersection.
Figure 5A:
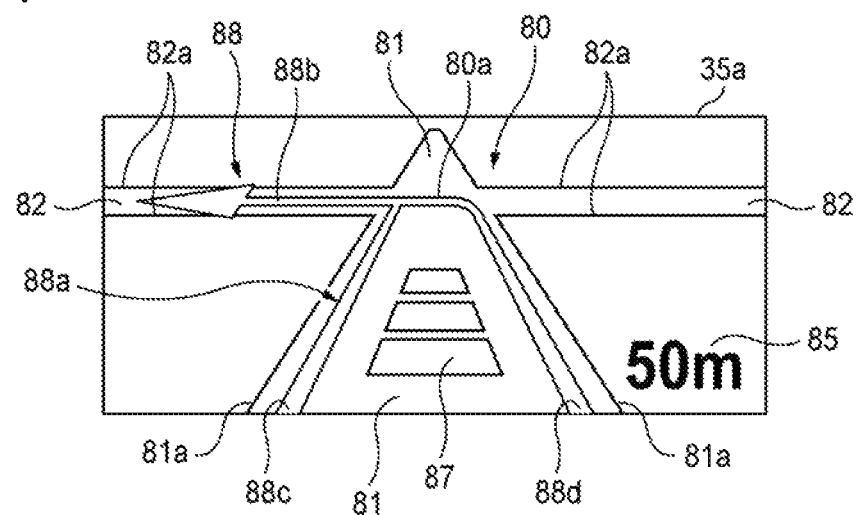
FIGS. 5A and 5B are diagrams for explaining in detail display contents of a head-up display 35 in the display unit 30 according to the embodiment of the present invention.
Figure 5B:
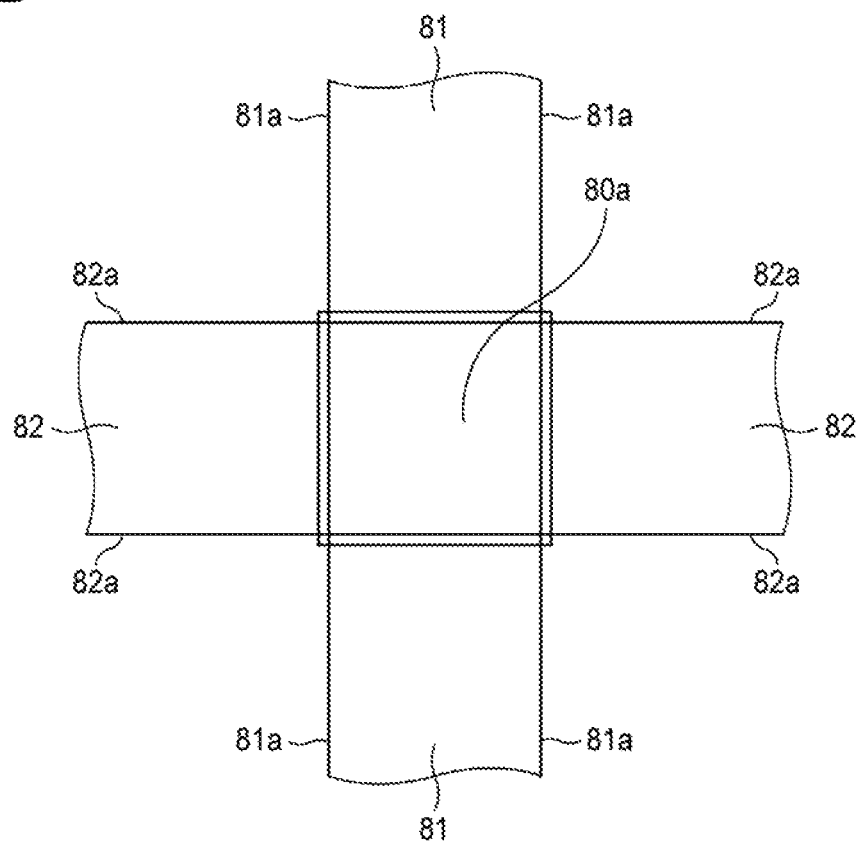

Next, display contents of the display unit 30 in the embodiment of the present invention will be described. Here, mainly the contents displayed on the meter panel 32 and the head-up display 35 will be described in detail. FIG. 3 is a diagram for explaining display contents of the display unit 30 according to the embodiment of the present invention when the host vehicle travels straight ahead. FIG. 4 is a diagram for explaining display contents of the display unit 30 according to the embodiment of the present invention when the host vehicle turns left at the next intersection. FIGS. 5A and 5B are diagrams for explaining in detail the display contents of the head-up display 35 in the display unit 30 according to the embodiment of the present invention. FIG. 5A is a pattern when video light from the head-up display 35 is visually recognized, and FIG. 5B is a plan view in the vicinity of the intersection as viewed from above, which schematically explains display contents of FIG. 5A.
[Display Contents when Host Vehicle Travels Straight Ahead]

First, the contents displayed on the meter panel 32 and the head-up display 35 when the host vehicle travels straight ahead will be described in detail with reference to FIG. 3. In FIG. 3, an image irradiated by the head-up display 35 and visually recognized by the driver is shown on an upper stage, and an image displayed on the meter panel 32 is shown on a lower stage.

In the image visually recognized by the head-up display 35, a first road 61 is represented as a pattern having a depth from a near side to a depth side in the figure. Specifically, end portions in a width direction of the first road 61 are represented by two solid lines 61a having a positional relationship that tapers from a lower side to an upper side in the figure, so that the first road 61 is simulated as a road. In addition, in the image visually recognized by the head-up display 35, a hood 65 of the host vehicle is represented by a curve that extends horizontally as a whole and is bent toward the lower side in the figure at both ends. In the image visually recognized by the head-up display 35, information on an inter-vehicle distance between the host vehicle and another vehicle traveling in front of the host vehicle in a traveling direction is represented as a bar graph 67. The bar graph 67 is displayed such that a direction in which a length of the bar varies has a positional relationship along an extending direction of the first road 61 (a direction from the near side to the depth side in the figure). In the bar graph 67, the length of the bar, that it, the number of three segments in FIG. 3 varies according to the inter-vehicle distance. In the bar graph 67, if the inter-vehicle distance is large, the number of visible segments increases, whereas if the inter-vehicle distance is small, the number of visible segments decreases.

In the image displayed on the meter panel 32, a pattern 70 simulating the host vehicle is drawn at a center of the meter panel 32 in the width direction (the left-right direction in the figure). In the image displayed on the meter panel 32, a road image 71 corresponding to the first road 61 displayed by the head-up display 35 is drawn at the center of the meter panel 32 in the width direction (the left-right direction in the figure). The road image 71 is drawn as a three-lane pattern in FIG. 3. Similarly to the first road 61, the road image 71 is represented as a pattern having a depth from the near side to the depth side in the figure. The pattern 70 imitating the host vehicle and the road image 71 are drawn on different layers, and the pattern 70 simulating the host vehicle is positioned at a higher layer than the road image 71. Therefore, the pattern 70 simulating the host vehicle is displayed in a state of being superimposed on the road image 71. Thus, the image displayed on the meter panel 32 includes the road image 71 in which the road on which the host vehicle travels is enlarged and displayed.

In the image displayed on the meter panel 32, a speedometer 72 indicating a traveling speed of the host vehicle is drawn on a left side of the meter panel 32 in the width direction (the left-right direction in the figure). The speedometer 72 has a circular shape as a whole. In the speedometer 72, speed memories 72a are marked clockwise at an interval of 20 km/h along a circumferential direction, and a speedometer frame body 72b indicating an outer shape is positioned along the circumferential direction A speed gauge 72c that extends and contracts along the circumferential direction of the speedometer frame body 72b is arranged on the speedometer frame body 72b. By the way, the control device 52 can obtain information on the speed of the host vehicle from the speed sensor 56. The speed gauge 72c extends and contracts along the speedometer frame body 72b according to the speed of the host vehicle detected by the speed sensor 56, whereby one end of the speed gauge 72c can indicate any speed. Further, in the image displayed on the meter panel 32, a digital numerical value 72d indicating the traveling speed of the host vehicle is drawn on an upper side of the meter panel 32 in a height direction (an upper-lower direction in the figure). The digital numerical value 72d has the same value as a speed value indicated by the speed gauge 72c.

In the image displayed on the meter panel 32, a power meter 73 indicating a charging-discharging situation to a battery is drawn on a right side of the meter panel 32 in the width direction (the left-right direction in the figure). The power meter 73 has a circular shape as a whole. In the power meter 73, statuses 73a are marked counterclockwise in an order of "CHARGE", "ECO", and "POWER" along the circumferential direction, and a power meter frame body 73b indicating an outer shape is positioned along the circumferential direction. A power gauge 73c that extends and contracts along the circumferential direction of the power meter frame body 73b is arranged on the power meter frame body 73b. The power gauge 73c extends and contracts along the power meter frame body 73b according to a charging situation detected by a power management unit (not shown) that manages the charging situation to the battery, whereby one end of the power gauge 73c can indicate any charging situation.

In the image displayed on the meter panel 32, the information on the inter-vehicle distance between the host vehicle and the other vehicle traveling in from of the host vehicle in the traveling direction is represented as a bar graph 77. Similarly to the bar graph 67 displayed by the head-up display 35, the bar graph 77 is displayed such that a direction in which a length of the bar varies has a positional relationship along an extending direction of the road image 71 (the direction from the near side to the depth side in the figure). In the bar graph 77, the length of the bar, that is, the number of three segments in FIG. 3 varies according to the inter-vehicle distance. In the bar graph 77, if the inter-vehicle distance is large, the number of visible segments increases, whereas if the inter-vehicle distance is small, the number of visible segments decreases. The bar graph 77 is superimposed on the road image 71 and displayed in front of the pattern 70 of the host vehicle in the traveling direction.

The meter panel 32 and the head-up display 35 output the display contents described above during a period in which the host vehicle is traveling straight ahead without an intersection for a while in the traveling direction of the host vehicle. Incidentally, the meter panel 32 can display various information other than the information described above. For example, an odometer, a fuel consumption numerical value, and a shift gauge as shown in FIG. 3 may be displayed. In addition, it is also possible to perform a highlighted display for alerting the driver when turning right or left or changing a lane to be described later, or a map display to be described later.

[Display Contents when Host Vehicle Turns Left at the Next Intersection]

Next, the contents displayed on the meter panel 32 and the head-up display 35 when the host vehicle turns left at the next intersection will be described in detail with reference to FIGS. 4, 5A and 5B. In FIG. 4, similarly to FIG. 3, the image irradiated by the head-up display 35 and visually recognized by the driver is shown on an upper stage, and the image displayed on the meter panel 32 is shown on a lower stage. By referring to the image irradiated by the head-up display 35 shown in FIG. 5A and the plan view shown in FIG. 5B together, the image irradiated by the head-up display 35 will be understood.

In the image visually recognized by the head-up display 35, an intersection image 80 simulating end portions in the width direction of two roads intersecting at an intersection is represented. The intersection image 80 includes a first road 81 and a second road 82 that intersect at an intersection 80a. In the intersection image 80, the first road 81 is represented as a pattern having a depth from the near side to the depth side in the figure. Specifically, end portions in a width direction of the first road 81 are represented by two solid lines 81a having a positional relationship that tapers from a lower side to an upper side in the figure, so that the first road 81 is simulated as a road on which the host vehicle is traveling. On the other hand, end portions in a width direction of the second road 82 are represented by two solid lines 82a extending in the left-right direction, which are separated in the upper-lower direction in the figure, so that the second road 82 is simulated as a road on which the host vehicle travels after turning left.

The control device 52 generates the intersection image 80 by processing the map data mounted on the navigation device 58. Specifically, the control device 52 reads a shape of the intersection at which the host vehicle turns left from the map data of the navigation device 58. The shape referred to here is an edge at both ends in the width direction of the road extending along the extending direction of the road in a plan view in which the intersection is vertically looked down shown in FIG. 5B. A range of the intersection to be read may be any range so long as a person can visually recognize the extending direction of the road intersecting at the intersection, and may be, for example, about 20 m to 30 m from a center of the intersection. When the edges of the two roads forming the intersection 80a is read, the control device 52 performs a coordinate conversion in which the above plan view is inclined by a predetermined angle so as to have a depth in the extending direction of the road on which the host vehicle travels. Thus, the intersection image 80 is obtained. Such an intersection image 80 is visually recognized by the driver so as to be tapered toward infinity (vanishing point) of the depth.

The intersection image 80 obtained in this way is very simple information including only information on the edges of a plurality of roads (the first road 81 and the second road 82 in FIGS. 4 and 5A) forming the intersection 80a. Such an intersection image 80 is suitable as information to be irradiated by the head-up display. Since the intersection image 80 is generated based on the map data of the navigation device 58, the shape of the intersection 80a is reconstructed with high accuracy. Therefore the driver can accurately grasp the shape of the road by visually recognizing the intersection image 80 irradiated by the head-up display. In addition, a height of the intersection image 80 to be irradiated (a height in the upper-lower direction in FIG. 5A) can be reduced by adjusting an inclination angle of the intersection image 80 for giving the depth. That is, the range in which the intersection image 80 is irradiated can be suppressed.

In the image visually recognized by the head-up display 35, the information on the inter-vehicle distance between the host vehicle and the other vehicle traveling in front of the host vehicle in the traveling direction is represented as a bar graph 87. The bar graph 87 is displayed such that a direction in which a length of the bar varies has a positional relationship along an extending direction of the first road 81 (the direction from the near side to the depth side in the figure). In the bar graph 87, the length of the bar, that is, the number of three segments in FIGS. 4 and 5A varies according to the inter-vehicle distance. In the bar graph 87, if the inter-vehicle distance is large, the number of visible segments increases, whereas if the inter-vehicle distance is small, the number of visible segments decreases. In addition, in the bar graph 87, one segment has a trapezoidal shape so as to match the depth of the intersection image 80, and each segment is wider at a lower position. In this way, similarly to the first road 81 of the intersection image 80, the bar graph 87 is also a pattern that tapers in the depth direction. From such a bar graph 87, the driver can intuitively grasp the inter-vehicle distance between the host vehicle and the other vehicle positioned in front of the host vehicle.

In the image visually recognized by the head-up display 35, information on an inter-intersection distance between the host vehicle and the nearest intersection 80a existing in front of the host vehicle in the traveling direction is represented as a digital numerical value 85. The control device 52 can obtain the information on the inter-intersection distance from the navigation device 58. The control device 52 outputs the information on the inter-intersection distance obtained from the navigation device 58 as the digital numerical value 85.

In the image visually recognized by the head-up display 35, a road on which the host vehicle should travel at the intersection 80a is indicated by an arrow 88. Specifically, the arrow 88 is represented as an arrow line extending upward from a lower side of the first road 81 to the intersection 80a and extending leftward from the intersection 80a to a left side of the second road 82. The arrow 88 is divided into a first arrow portion 88a extending along the first road 81 on which the host vehicle is traveling toward live intersection 80a, and a second arrow portion 88b extending along the second road 82 on which the host vehicle traveling away from the intersection 80a advances after entering the intersection 80a. The first arrow portion 88a has a role of indicating a direction in which the host vehicle enters the intersection 80a, and the second arrow portion 88b has a role of indicating a direction in which the vehicle travels away from the intersection 80a. By visually recognizing such an arrow 88, the driver can determine the road on which the host vehicle should travel at the next intersection.

The first arrow portion 88a has an outer shape along an end portion (the solid line 81a) of the first road 81. More specifically, the outer shape of the first arrow portion 88a is approximately the same as or slightly smaller than the end portions (the solid lines 81a) of the first road 81, and is sized to fit in an area surrounded by the solid lines 81a. In this way, similarly to the first road 81 of the intersection image 80, the first arrow portion 88a is also a pattern that tapers in the depth direction. By clearly indicating that the first arrow portion 88a extends in the extending direction of the first road 81, it is possible to cause the driver to recognize that the first arrow portion 88a is the host vehicle traveling on the first road 81. In addition, the first arrow portion 88a is divided into a left side line portion 88c along a left end portion (the solid line 81a on a left side in FIG. 5) of the first road 81 and a right side line portion 88d along a right end portion (the solid line 81a on a right side in FIG. 5) of the first road 81. That is, the inside of the first arrow portion 88a is drawn so as to be hollow. Further, the bar graph 87 is positioned between the left side line portion 88c and the right side line portion 88d forming the first arrow portion 88a.

One end portion of the left side line portion 88c and one end portion of the right side line portion 88d of the first arrow portion 88a are connected to one end portion of the second arrow portion 88b positioned at the center of she intersection 80a. On the other hand, another end portion of the second arrow portion 88b has a triangular shape pointing to a direction in which the host vehicle should travel. The first arrow portion 88a and the second arrow portion 88b are drawn as a pattern having a character "λ (lambda)" as a whole. The bar graph 87 is displayed so as to fit within an area of the first road 81 surrounded by the first arrow portion 88*a* (the left side line portion 88*c* and the right side line portion 88*d*) and the second arrow portion 88*b*. In this way, by drawing the bar graph 87 in a space left inside the arrow 88, it is not necessary to secure an area for presenting the information on the inter-vehicle distance separately from the areas of the first road 81 and the arrow 88. Therefore, a limited irradiation range irradiated by the head-up display 35 can be effectively used.

The contents displayed on the meter panel 32 is common to the contents described in the above item [display contents when the host vehicle travels straight ahead], except that an inter-intersection distance 75 is marked on a right side of the road image 71.

In the present item [display contents when the host vehicle turns left at the intersection], the display contents when the host vehicle turns left is described. Since display contents when turning right is common except that the direction of the arrow is reversed left and right, the repeated description will be omitted.

[Transition of Driving Assistance Display when Host Vehicle Turns Left]

Next, as an example of the driving assistance display by the display unit 30 according to the embodiment of the present invention, a transition of the display contents when the host vehicle turns left at the next intersection will be described with reference to FIGS. 6 to 9. FIGS. 6 to 9 are diagrams for explaining the transition of the display contents of the display unit 30 according to the embodiment of the present invention when the host vehicle turns left at the next intersection.

The control device 52 causes the meter panel 32 and the head-up display 35 to display the display contents shown in FIG. 3 described in the previous item [display contents when the host vehicle travels straight ahead] during a period in which the host vehicle continues traveling straight ahead toward the intersection at which the host vehicle turns left. During this period, the control device 52 receives a signal from the navigation device 58 and monitors the inter-intersection distance between the host vehicle and the intersection at which the host vehicle turns left. When the inter-intersection distance falls below a predetermined value of "50 m", the control device 52 causes the meter panel 32 and the head-up display 35 to display the display contents shown in FIG. 6. The head-up display 35 displays the intersection image 80, the inter-intersection distance (the digital numerical value 85), the inter-vehicle distance (the bar graph 87), and the arrow 88, as described in the previous item (display contents when the host vehicle turns left at the next intersection). In the image shown in FIG. 6, the intersection image 80 displayed by the head-up display 35 has a shape simulating an intersection of a crossroad, the inter-intersection distance is "50 m", the inter-vehicle distance is three segments, and the arrow 88 is left-turn.

The meter panel 32 displays the pattern 70 simulating the host vehicle, the road image 71, the speedometer 72, the power meter 73, the inter-intersection distance 75, and the bar graph 77, as described in the previous item [display contents when the host vehicle turns left at the next intersection]. In the image displayed on the meter panel 32, the road image 71 has three lanes including a left-turn lane, a straight-ahead lane, and a right-turn lane, respectively, and the pattern 70 simulating the host vehicle is disposed in the straight-ahead lane. In addition, the speedometer 72 indicates that the speed is "60 km/h", and the power meter 73 indicates that a status indicating a traveling situation is "ECO", and the inter-intersection distance 75 indicates "50 m". Further, in the road image 71, the left-turn lane to be traveled is highlighted and displayed in order to turn left. The highlighted display is represented by coloring an area including a road marking in the left-turn lane (a colored portion 76 in FIG. 6 is drawn by hatching).

Figure 6:
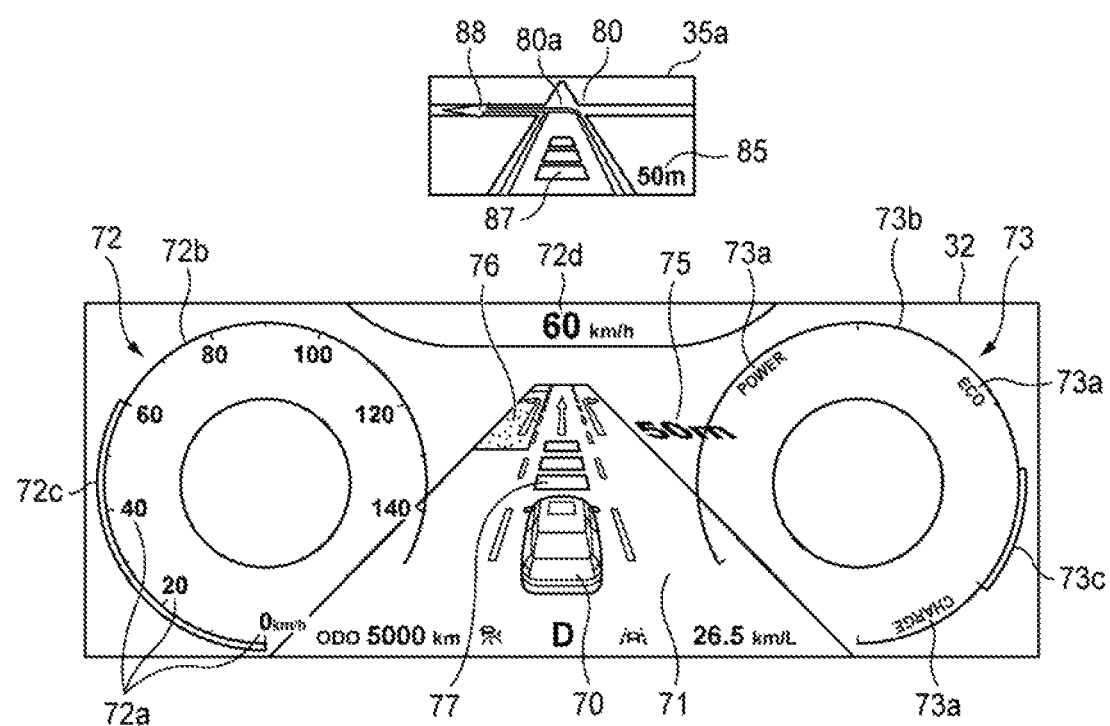
FIG. 6 is a diagram for explaining a transition of the display contents of the display unit 30 according to the embodiment of the present invention when the host vehicle turns left at the next intersection.

With the display by the display unit 30 shown in FIG. 6, the driver can accurately grasp the shape of the road by visually recognizing the intersection image 80 irradiated by the head-up display. In addition, by visually recognizing the road image 71 displayed on the meter panel 32, the driver can grasp which lane should be traveled in order for the host vehicle to turn left. Incidentally, a time point at which the highlighted display is started in the road image 71 may be before the inter-intersection distance falls below the predetermined value of "50 m". If the road image 71 is highlighted when the inter-intersection distance falls below, for example, 500 to 700 m, the driver can have enough time to change lines.

Figure 7:
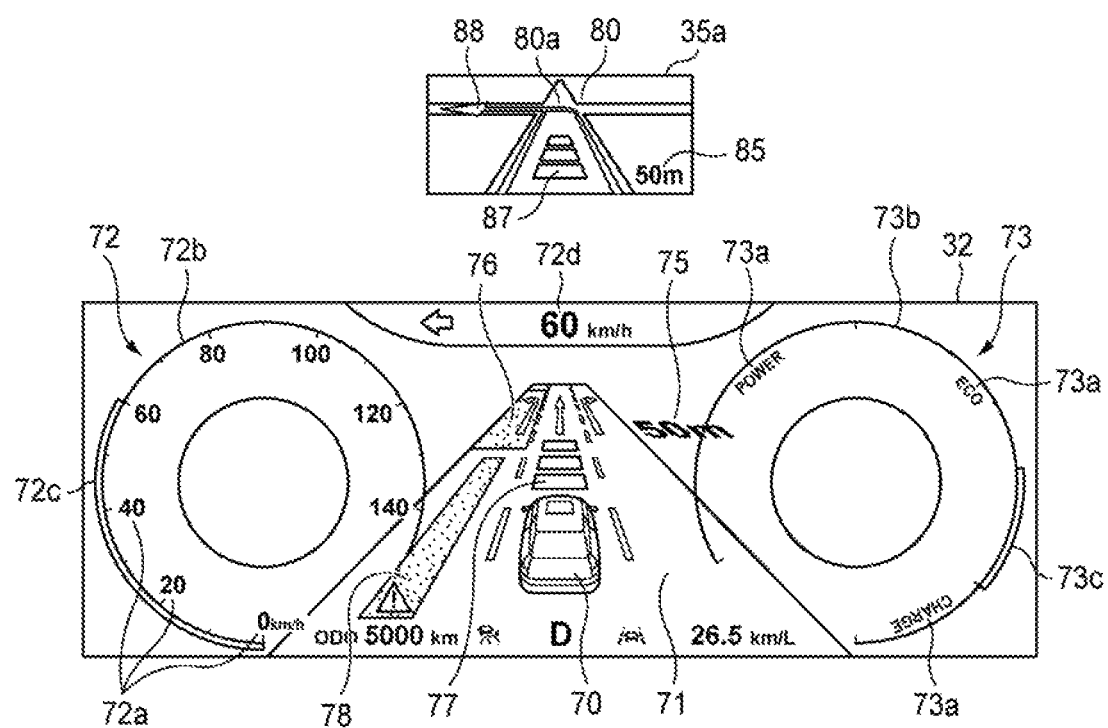
FIG. 7 is a diagram for explaining the transition of the display contents of the display unit 30 according to the embodiment of the present invention when the host vehicle turns left at the next intersection.

Next, upon receiving a signal indicating that the operation SW 53 has been lilted leftward from the winker lever, the control device 52 causes the meter panel 32 and the head-up display 35 to display the display contents shown in FIG. 7. When the difference from the display contents shown in FIG. 6 is described, there is no difference in the display contents by the head-up display 35. On the other hand, in the image displayed on the meter panel 32, the bar graph 77 disappears, and an arrow directed to the left blinks on a left side of the digital numerical value 72*d*. Further, when the sensor detects that the other vehicle is traveling behind the host vehicle in the traveling direction in the lane to be changed by the host vehicle, the left-turn lane of the road image 71 to be lane changed by the host vehicle is highlighted. The highlighted display is represented by coloring an area close to the pattern of the host vehicle in the left-turn lane (a colored portion 78 in FIG. 7 is drawn by hatching). When the control device 52 receives the signal from the winker lever, the control device 52 can determine whether the signal is generated by the push-down of the lever for changing the lane or the push-down of the lever for turning right or left according to the distance to the intersection. The control device 52 can perform a highlighting display by a reference numeral 78 by determining that the push-down of the winker lever while the distance to the intersection is 50 m is to change the lane.

With the display by the display unit 30 shown in FIG. 7, the driver can accurately grasp the shape of the road by visually recognizing the intersection image 80 irradiated by the head-up display. In addition, the driver can change the lane while paying attention to other vehicles by visually recognizing the highlighted display indicated by the reference numeral 78 when the other vehicle is traveling behind the host vehicle in the lane to be changed even when the lane is changed.

Figure 8:
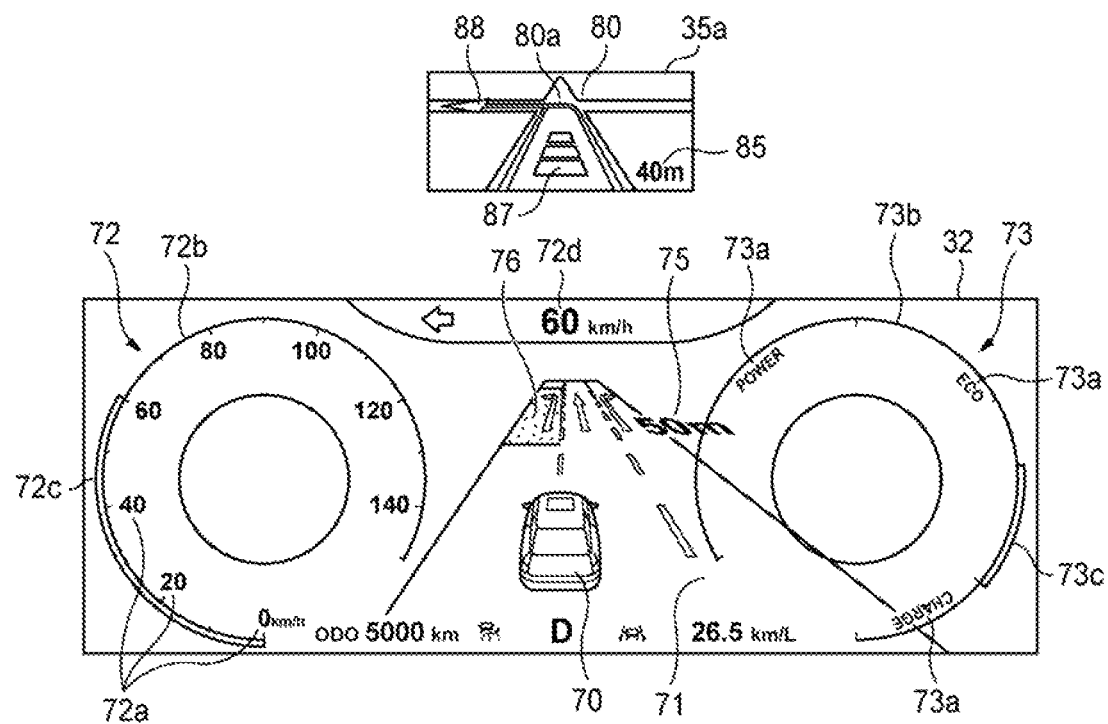
FIG. 8 is a diagram for explaining the transition of the display contents of the display unit 30 according to the embodiment of the present invention when the host vehicle turns left at the next intersection.
Figure 9:
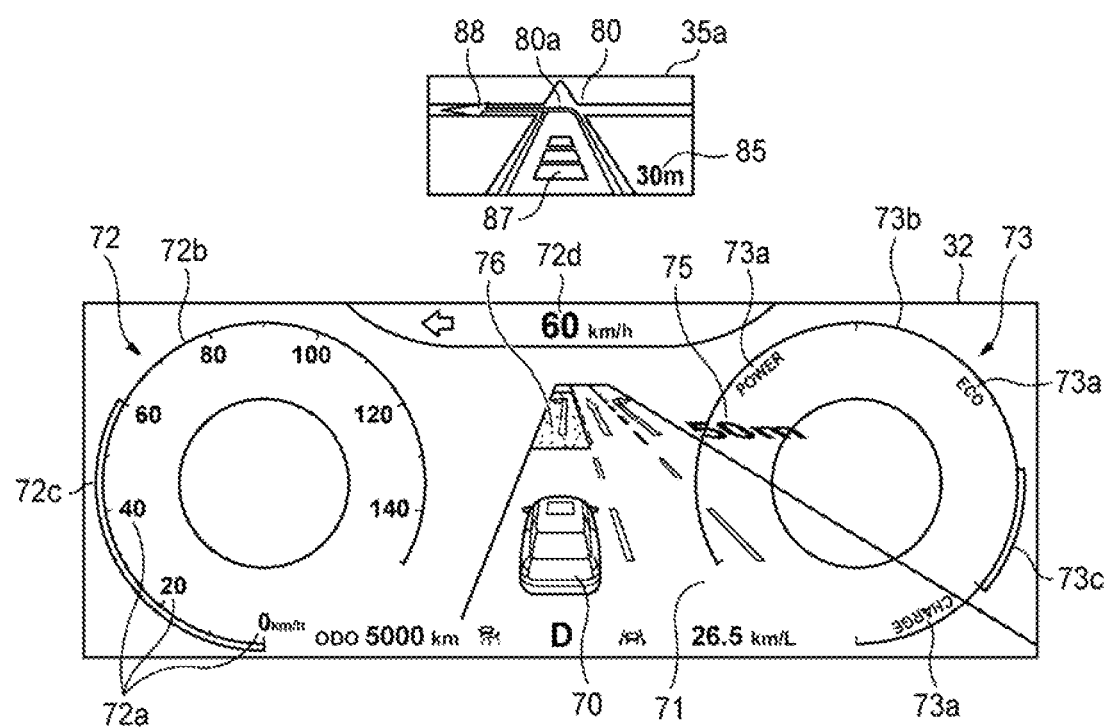
FIG. 9 is a diagram for explaining the transition of the display contents of the display unit 30 according to the embodiment of the present invention when the host vehicle turns left at the next intersection.

Next, when the control device 52 detects the lane change of the host vehicle by various sensors, the control device 52 causes the meter panel 32 and the head-up display 35 to display the display contents shown in FIGS. 8 and 9. When the difference from the display contents shown in FIG. 7 is described, there is no difference in the display contents by the head-up display 35. On the other hand, in the image displayed on the meter panel 32, the highlighted display indicated by the reference numeral 78 disappears, and the pattern 70 simulating the host vehicle moves from the straight-ahead lane to the left-turn lane of the road image 71.

The driving assistance by the display unit 30 according to the embodiment of the present invention has been described above with reference to FIGS. 6 to 9.

[Effects of Driving Assistance Display when Host Vehicle Turns Left]

According to the display unit 30 according to the embodiment of the present invention, the intersection image 80 is the very simple information including only the information on the edges of the plurality of roads (the first road 81 and the second road 82 in FIGS. 4 and 5A) forming the intersection 80a. Such an intersection image 80 is suitable as information to be irradiated by the head-up display. Therefore the driver can accurately grasp the shape of the road by visually recognizing the intersection image 80 irradiated by the head-up display 35. Further, in the intersection image 80, the bar graph 87, the inter-intersection distance (the digital numerical value 85), and the arrow 88 are displayed in combination. As a result, the driver can grasp how many steering angles are required to operate the steering wheel for turning right or left while imagining the shape of the intersection at which the host vehicle turns right or left. Such driving assistance is very beneficial for the driver.

According to the display unit 30 according to the embodiment of the present invention, by displaying the information on the inter-vehicle distance on the first road 81, it is not necessary to secure the area for presenting the information on the inter-vehicle distance separately from the first road 81. Therefore, the limited irradiation range irradiated by the head-up display can be effectively used.

According to the display unit 30 according to the embodiment of the present invention, by drawing the bar graph 87 in the space left inside the arrow 88, it is not necessary to secure the area for presenting the information on the inter-vehicle distance separately from the areas of the first road 81 and the arrow 88. Therefore, the limited irradiation range irradiated by the head-up display can be effectively used.

According to the display unit 30 according to the embodiment of the present invention, since the intersection image 80 is displayed with the depth, the height of the irradiated intersection image 80 can be reduced as compared with a case where the intersection is irradiated as a plan view as viewed from above. That is, the range in which the intersection image 80 is irradiated can be suppressed. Therefore, the limited irradiation range irradiated by the head-up display can be effectively used.

According to the display unit 30 according to the embodiment of the present invention, it is possible to provide the driving assistance by combining the head-up display with the meter panel 32 different from the head-up display 35. That is, the driving assistance by the meter panel 32 can compensate for a structural disadvantage of the head-up display 35 while utilizing advantages of the driving assistance by the head-up display 35.

As described above, according to the display unit 30 in the embodiment of the present invention, an accurate shape of the intersection can be presented to the driver by the head-up display. This is very beneficial because the driver can grasp how many steering angles is required to operate the steering wheel for turning right or left. In addition, a layout in which necessary and sufficient information (the information on the inter-vehicle distance, the information on the inter-intersection distance, the intersection image, and the arrow) can be presented within the range is found within the limited irradiation range in which the head-up display can present information. By the driving assistance by the head-up display, the driver can obtain the sufficient driving assistance necessary for turning right or left of the host vehicle only by presenting the information from the head-up display.

[Transition of Driving Assistance Display when Switching from Road Display State to Map Display State]

Next, as an example of the driving assistance display by the display unit 30 according to the embodiment of the present invention, a transition of the display contents when switching from a road display state to a map display state will be described with reference to FIGS. 10A to 11C. FIGS. 10A to 11C are diagrams for explaining the transition of the display contents of the display unit 30 according to the embodiment of the present invention when the display unit 30 switches from the road display state to the map display state.

In the display unit 30 according to the embodiment of the present invention, various information can be displayed on the meter panel by using a liquid crystal display on the meter panel 32. One piece of information is to display a map on the meter panel 32. In this item, the display unit 30 that switches and displays a state (sometimes referred to as a road display state) in which the road image 71 as shown in FIGS. 3 and 4 is displayed and a state (sometimes referred to as a map display state) in which a map image is displayed will be described.

Figure 10A:
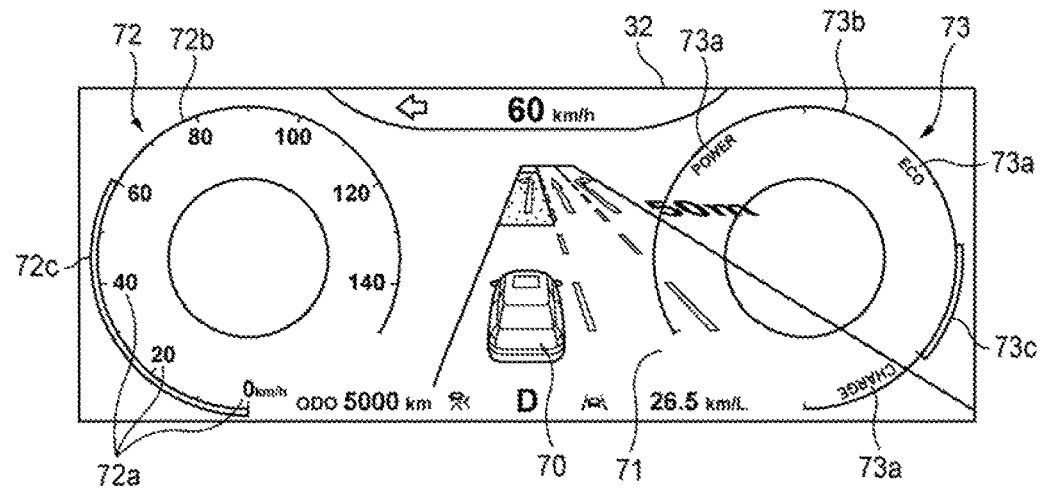
FIGS. 10A to 10C are diagrams for explaining a transition of display contents when the display unit 30 according to the embodiment of the present invention switches from a road display state to a map display state.
Figure 10B:
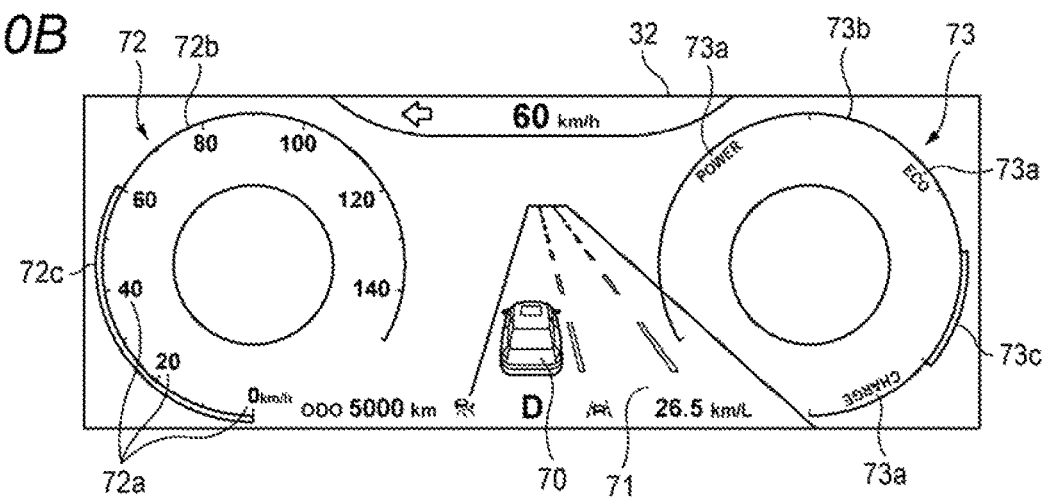
Figure 10C:
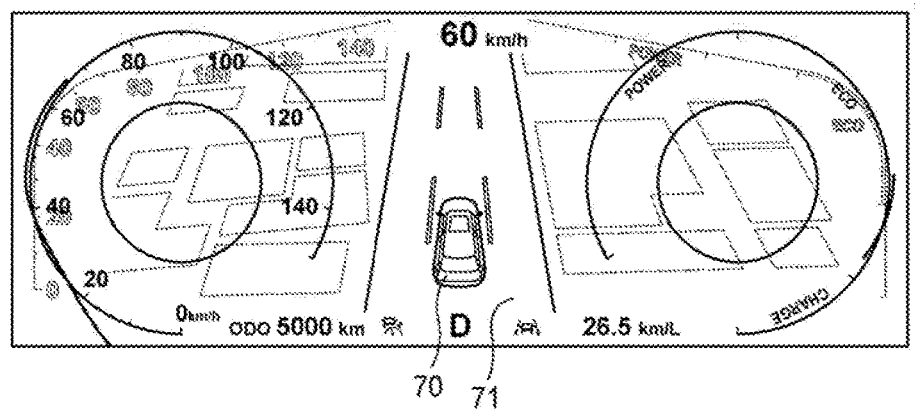

As shown in FIG. 10A, the road display state referred to in the present embodiment refers to a situation in which the instrument (the speedometer 72 and the power meter 73) and the road image 71 on which the road on which the host vehicle travels is enlarged and displayed are displayed on the meter panel 32. In addition, as shown in FIG. 11C, the map display slate refers to a situation in which a map image 91 in which an area including a point where the host vehicle travels is reduced and displayed, and map frame bodies 92, 93 in which the map image 91 is positioned are displayed on the meter panel 32. The enlarged and displayed road image 71 and the map image 91 in which the area is reduced and displayed have different ranges (area on the map) in which the information is presented, but the road image 71 and the map image 91 are information indicating a position of the host vehicle and can be said to be information with high affinity. When the road display state and the map display state are switched, if the road image 71 and the map image can be connected so as to be smoothly continuous, the driver does not feel unnatural in the switching. Hereinafter, the display contents of the display unit 30 according to the embodiment of the present invention when switching from the road display state to the map display state will be described in detail.

FIG. 10A shows a display example displayed on the meter panel 32 when in the road display state. When in the road display state, the instrument (the speedometer 72 and the power meter 73) in which various information (the speed memories 72a and the statuses 73a) is marked along the circumferential direction and an instrument frame body (the speedometer frame body 72b and the power meter frame body 73b) indicating an outer shape is positioned along the circumferential direction and the road image 71 in which the road on which the host vehicle travels is enlarged and displayed are displayed on the meter panel 32. Since the respective displayed elements are the same as those described in the previous item [display contents of the display unit], the description thereof will be omitted.

Figure 11A:
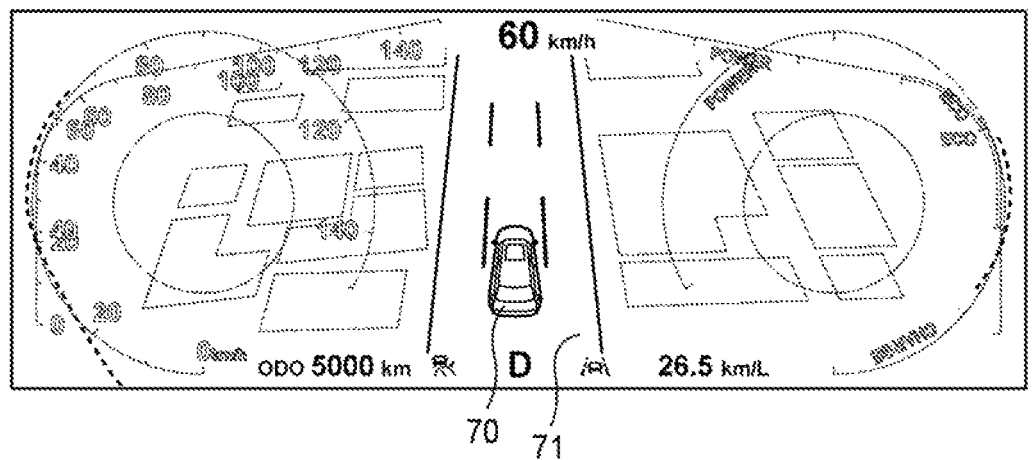
FIGS. 11A to 11C are diagrams for explaining the transition of the display contents when the display unit 30 according to the embodiment of the present invention switches from the road display state to the map display state.
Figure 11B:
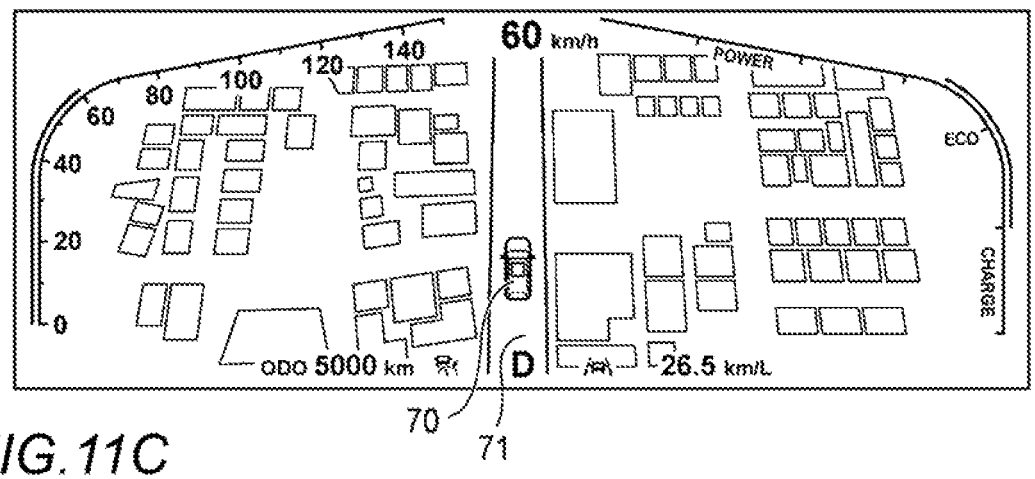
Figure 11C:
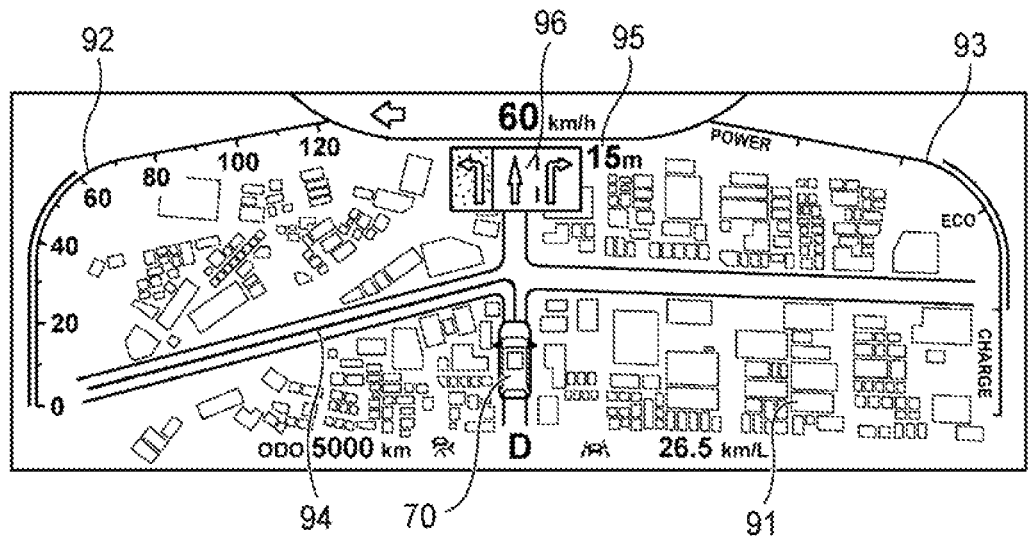

FIGS. 10B to 11B are display examples displayed on the meter panel 32 during the transition from the road display state to the map display state. The display contents transition in an order of FIG. 10B. FIG. 10C, FIG. 11A, and FIG. 11B. Referring to FIGS. 10B to 11C, it can be seen that the road image 71 is gradually reduced and displayed. Specifically, the road image 71 is an image in which the road on which the vehicle travels is in a bird's eye view from a higher point, and a planar image in which the depth of the road represented in FIG. 10A gradually decreases.

Referring to FIGS. 10B to 11C, it can be seen that the outer shape of the instrument (the speedometer 72 and the power meter 73) gradually changes. Specifically, the gauge (the speed gauge 72c and the power gauge 73c) is deformed from a circular arc shape such that an interval between both end portions is widened. In addition, the instrument frame body (the speedometer frame body 72b and the power meter frame body 73b) having a circular shape gradually fades, and another frame body gradually emerges around a position where the instrument frame body (the speedometer frame body 72b and the power meter frame body 73b) was disposed, in FIG. 11A, these frame bodies are indicated by dotted lines to indicate a pattern that gradually fades or gradually emerges. At this lime, the other frame body is positioned so as to surround the map image in a process where the map image is reduced and displayed. As shown in FIG. 11B, in the other frame body, the information (the speed memories 72a and the statuses 73a) provided to the instrument frame body (the speedometer frame body 72b and the power meter frame body 73b) before the instrument frame body is reduced and displayed is provided without changing the arrangement order.

FIG. 11C is a display example displayed on the meter panel 32 when in the map display state. As a result of the transition of the display content as shown in FIGS. 10B to 11C, the map image 91 in which the area including the point where the host vehicle travels is reduced and displayed and the map frame bodies 92, 93 in which the map image 91 is positioned are displayed. The map image 91 is reduced and displayed when viewed from the road image 71 in FIG. 10A. In addition, the map frame bodies 92, 93 are formed by deforming the instrument frame body (the speedometer frame body 72b and the power meter frame body 73b) of FIG. 10A. The information presented by the speedometer 72 is passed on to the map frame body 92 and the information presented by the power meter 73 is passed on to the map frame body 93. In the map image 91, a route 94 on which the host vehicle travels is displayed in a superimposed manner, and an area centered on the intersection at which the host vehicle turns left is drawn. In the map image 91, an inter-intersection distance 95 is displayed in a superimposed manner at a center of the upper side (an upper side in the figure). In addition, in the map image 91, a lane image 96 related to a lane on which the host vehicle is traveling is displayed in a superimposed manner at the center of the upper side (the upper side in the figure). Further, in the lane image 96, a left-turn lane to be traveled is highlighted and displayed in order to turn left.

The transition of the display contents when switching from the road display state to the map display state are switched has been described with reference to FIG. 10A to 11C. Conversely, when switching from the map display state to the road display state, the display contents transition in an order of FIG. 11C, FIG. 11B, FIG. 11A, FIG. 10C, FIG. 10B, and FIG. 10A.

[Effects of Driving Assistance Display when Switching from Road Display State to Map Display State]

The enlarged and displayed road image 71 and the map image 91 in which the area is reduced and displayed have different ranges (area on the map) in which the information is presented, but the road image 71 and the map image 91 are the information indicating the position of the host vehicle and can be said to be the information with high affinity. According to the display unit 30 according to the embodiment of the present invention, when the road display state and the map display state are switched, the road image and the map image are connected so as to be smoothly continuous, so that the driver does not feel unnatural in the switching.

According to the display unit 30 according to the embodiment of the present invention, when switching from the road display state to the map display state, various information marked on the instrument (the speedometer and the power meter) is passed on to the map frame body. As described above, since the driving information is passed between the road display state and the map display state, the driver can continue to check the driving information without losing sight even when the image is switched.

In addition, according to the display unit 30 in the embodiment of the present invention, by displaying the area centered on the intersection at which the host vehicle turns right or left, the driving information desired to be known by the driver can be presented in a timely manner.

Here, characteristics of the embodiment of the display unit according to the present invention described above are summarized briefly in the following [1] to [10], respectively.

[1] A display unit (30) including:

a first display (head-up display 35; configured to display various information by irradiating a surface to be irradiated with video light: and a control part (control device 52) configured to control the first display (head-up display 35), wherein the control part (control device 52) controls to display information (bar graph 87) on an inter-vehicle distance between a host vehicle and another vehicle traveling in front of the host vehicle in a traveling direction, information (digital numerical value 85) on an inter-intersection distance between the host vehicle and a nearest intersection (80a) existing in from of the host vehicle in the traveling direction, an intersection image (80) representing end portions in a width direction of roads intersecting at the intersection (80a), and an arrow (88) pointing to a road on which the host vehicle should travel at the intersection (80a) on the first display (head-up display 35).

[2] The display unit (30) according to the above [1], wherein the intersection image (80) includes a first road (81) and a second road (82) intersecting at the intersection (80a), wherein the arrow (88) includes a first arrow portion (88a) extending along the first road (81) on which the host vehicle is traveling toward the intersection (80a), and a second arrow portion (88b) extending along the second road (82) on which the host vehicle traveling away from the intersection (80a) advances after entering the intersection (80a), and wherein the control part (control device 52) causes the first display (head-up display 35) to display the first arrow portion (88a) having an outer shape along both end portions (solid line 81a) in the width direction of the first road (81) so as to fit the first arrow portion (88a) in the first road (81) in the intersection image (80).

[3] The display unit (30) according to the above [2], wherein the control part (control device 52) causes the first display (head-up display 35) to display the information on the inter-vehicle distance (bar graph 87) so as to fit the information in the first road (81).

[4] The display unit (30) according to the above [3], wherein the information on the inter-vehicle distance (bar graph 87) is represented as a bar graph in which a length of the bar varies according to the inter-vehicle distance, and wherein the control part (control device 52) causes the first display (head-up display 35) to display the bar graph such that a direction in which the length of the bar varies is along an extending direction of the first road (81).

[5] The display unit (30) according to the above [4],
wherein the intersection image (80) is represented as a pattern having a depth along the extending direction of the first road (81), and
wherein the control part (control device 52) causes the first display (head-up display 35) to display the first arrow portion (88*a*) and the bar graph (87) such that the intersection image (80) is tapered toward a vanishing point thereof.

[6] The display unit (30) according to the above [5],
wherein the first arrow portion (88*a*) is divided into a left side line portion (88*c*) along a left end portion of the first road (81) in the width direction and a right side line portion (88*d*) along a right end portion of the first road (81) in the width direction, and one end portion of the left side line portion (88*c*) and one end portion of the right side line portion (88*d*) in a depth direction are connected to the second arrow portion (88*b*), and
wherein the control part (control device 52) causes the first display (head-up display 35) to display the bar graph (87) such that the bar graph (87) fits within an area of the first road (81) surrounded by the left side line portion (88*c*) and the right side line portion (88*d*) forming the first arrow portion (88*a*) and the second arrow portion (88*b*).

[7] The display unit (30) according to the above [6], further including:
a second display (meter panel 32) configured to display various information,
wherein the control part (control device 52) controls the second display (meter panel 32), and causes the second display (meter panel 32) to display a road image (71) simulating a detailed shape related to the first road (81), and display the host vehicle traveling on the first road (81) by superimposing host vehicle on the road image (71).

[8] The display unit (30) according to the above [7],
wherein the control part (control device 52) performs a highlighted display (76) of a lane to be traveled in the road image (71) in order to turn right or left, when the host vehicle turns right or left at the intersection (80*a*).

[9] The display unit (30) according to the above [7] or [8],
wherein the control part (control device 52) superimposes the information on the inter-vehicle distance (bar graph 77) on the road image (71) and displays the information in front of the host vehicle in the traveling direction.

[10] The display unit (30) according to anyone of the above [7] or [9],
wherein the control part (control device 52) performs a highlighted display (78) of a lane to be changed by the host vehicle in the road image (71) when another vehicle is traveling behind the host vehicle in the traveling direction in the lane to be changed by the host vehicle even when a lane is changed.

What is claimed is:

1. A display unit comprising:
a first display configured to display information by irradiating a surface to be irradiated with video light; and
an electronic controller configured to implement instructions to control the first display to:
display information on an inter-vehicle distance between a host vehicle and another vehicle traveling in front of the host vehicle in a traveling direction,
display information on an inter-intersection distance between the host vehicle and a nearest intersection existing in front of the host vehicle in the traveling direction,
display an intersection image representing end portions in a width direction of a first road on which a vehicle is traveling and a second road intersecting the first road at the intersection, and an arrow pointing to the second road on which the host vehicle should travel at the intersection on the first display, so that the information on the inter-vehicle distance, the information on the inter-intersection distance, the intersection image representing the end portions indicating respective widths of the first and second roads, and the arrow are displayed at the same time,
wherein the arrow includes a first arrow portion extending along the first road on which the host vehicle is traveling toward the intersection, and a second arrow portion extending along the second road on which the host vehicle is traveling away from the intersection advances after entering the intersection, and
wherein the electronic controller controls the first display to display the first arrow portion having an outer shape along both end portions of the first road in the width direction so as to fit the first arrow portion in the first road in the intersection image,
wherein the first arrow portion is divided into a left side line portion along a left end portion of the first road in the width direction and a right side line portion along a right end portion of the first road in the width direction, and one end portion of the left side line portion and one end portion of the right side line portion in a depth direction, with respect to the intersection image, are connected to the second arrow portion, and
wherein the electronic controller controls the first display to display the information on the inter-vehicle distance such that the information on the inter-vehicle distance is completely within an area of the first road, and is separate from and surrounded by the left side line portion and the right side line portion, forming the first arrow portion, and the second arrow portion.

2. The display unit according to claim 1,
wherein the information on the inter-vehicle distance is represented as a bar graph in which a length of a bar of the bar graph varies according to the inter-vehicle distance, and
wherein the electronic controller controls the first display to display the bar graph such that a direction in which the length of the bar varies is along an extending direction of the first road.

3. The display unit according to claim 2,
wherein the intersection image is represented as a pattern having a depth along the extending direction of the first road, and
wherein the electronic controller controls the first display to display the first arrow portion and the bar graph such that the intersection image is tapered toward a vanishing point thereof.

4. The display unit according to claim 3, further comprising a second display configured to display information,
wherein the electronic controller controls the second display, and
wherein the electronic controller controls the second display to display a road image representing a shape related to the first road, and displays the host vehicle traveling on the first road by superimposing the host vehicle on the road image.

5. The display unit according to claim 4,
wherein the electronic controller highlights a turn lane in the road image, that corresponds to a turn lane of the first road for turning on to the second road in a direction that corresponds to a pointing direction of the arrow in the intersection image, while the electronic controller controls the first display to display the intersection image that includes the arrow pointing to the second road, and
wherein the electronic controller highlights the turn lane in the road image while the host vehicle is not presently in the turn lane of the first road.

6. The display unit according to claim 4,
wherein the electronic controller superimposes the information on the inter-vehicle distance on the road image and displays the information in front of the host vehicle in the traveling direction.

7. The display unit according to claim 4,
wherein the electronic controller highlights a lane to be changed by the host vehicle in the road image when another vehicle is traveling behind the host vehicle in the traveling direction in the lane to be changed by the host vehicle even when a lane is changed.

* * * * *